3,291,653
HARD FACING TREATMENT OF STEEL BODIES
Howard F. Eilers, St. Paul, Minn., assignor to Paper Calmenson & Co., a corporation of Minnesota
No Drawing. Filed Jan. 30, 1964, Ser. No. 341,432
3 Claims. (Cl. 148—12.1)

This invention relates to improvements in the art of hard facing steel bodies and particularly to an improved hard facing composition in the form of a welding rod and a process for treating steel bodies having a hard surface area comprising an alloy steel matrix containing discrete particles of a hard metal carbide.

It is an object of this invention to prolong the useful life of steel bodies which are to be subjected to severe abrasion and impact forces by retaining particles of a hard metal carbide, e.g., tungsten carbide, on the body in a matrix of low carbon steel alloy whereby to greatly reduce the rate of spawling and other loss of the hard facing material.

A particular object is to reduce the cost of face hardened steel bodies and prolong their life by applying to selected surface areas of suitable steel workpieces a facing material comprising hard metal carbide particles in a composite mass or matrix of low carbon alloy steel having high tensile and yield strength combined with other properties such as elongation and hardness as specifically required to prolong the retention of the carbide particles in the matrix under severe conditions of abrasion and shock in use.

A further object is to prolong the life of hard face steel bodies carrying hard metal carbide particles in a steel alloy by carburizing treatment and/or other surface hardening treatment of such hard face material.

Other objects will appear and be more fully pointed out in the following specification and claims.

My improved hard facing material may best be provided in the form of welding rods of novel composition, but otherwise of conventional form, consisting of a steel tube containing powdered metal carbide and a suitable flux to retain the carbide particles in the tube. Such tubes are formed from cold rolled strip steel containing critical proportions of alloy metals. The carbide particles are metered on the special alloy steel strip and the strip is rolled to form welding rods in conventional manner. A preferred carbide is powdered tungsten carbide, although other suitable hard metal carbides may be used for the purpose. Examples are the carbides of tantalum, titanium, chromium, columbium and molybdenum. Further, according to conventional practice, the face hardening material may be applied to a selected area of the steel body to be surface hardened by melting the tube containing the carbide particles by means of an oxy-acetylene flame.

Tungsten carbide face hardening is usually subjected to severe abrasion and impact forces which make its ultimate life largely dependent upon the tenacity with which the matrix formed by the tube steel retains the small particles of powdered carbide. It is known that the ultimate life of the tungsten carbide particles far exceeds the life of the matrix containing them.

The present invention is based on the discovery that the life of surface hardening steel bodies is greatly increased by providing a matrix steel formed from a tube consisting of a low carbon steel alloy of nickel, chromium and molybdenum in specific proportions or ranges of proportions containing suitable carbide particles and providing additional surface hardening treatment for the matrix containing the carbide particles and steel body. The essential physical properties of cold rolled alloy strip for use in the formation of my welding rod are shown by the following table:

*Table I*

Tensile strength _____ 75,000 to 120,000 p.s.i.
Yield strength _____ 50,000 to 70,000 p.s.i.
Elongation _____ 15% to 35% (in two inches).
Reduction of area _____ 40% to 60%.
Brinell hardness _____ 149 to 250.

Examples of suitable steel alloys for use in forming the welding rod tubes and their American Iron and Steel Institute designations are shown in Table II as follows:

*Table II*

| | AISI Number | C | Mn | Ni | Cr | Mo |
|---|---|---|---|---|---|---|
| 1 | 4320 | 0.17/0.22 | 0.45/0.65 | 1.65/2.00 | 0.40/0.60 | 0.20/0.30 |
| 2 | 8620 | 0.18/0.23 | 0.70/0.90 | 0.40/0.70 | 0.40/0.60 | 0.15/0.25 |
| 3 | E9310 | 0.08/0.13 | 0.45/0.65 | 3.00/3.50 | 1.00/1.40 | 0.08/0.15 |

These steels contain small amounts of incidental elements including phosphorous and sulfur in the range .025% to .040% and silicon 0.20% to 0.35%.

Such alloys may be cold rolled to the form of strip steel, adapted then to be fabricated into a tube with tungsten carbide powder and a suitable flux to provide a welding rod which is preferably composed of about 60% tungsten carbide and 40% steel alloy. For hard facing material where lower abrasive properties are required, the composite rod may contain lower proportions of tungsten carbide, e.g., 30%–40%. The essential components of the alloys used in forming my welding rod tubes are low carbon content, viz., less than 0.3% and preferably within the range .08–23% and nickel, chromium and molybdenum approximately in the ranges: Ni 3.75% to .40%, chromium 1.40%–.40% and molybdenum .08%–.30%. The presence of manganese as in the example analyses set forth in Table II is beneficial although not essential to the effectiveness of the alloy steels used in the tubes containing the powdered metal carbides.

One important field of use for my improved hard facing material and treatment is in the manufacture of hammermill hammers such as those described in Patents No. 3,045,934, granted July 24, 1962, and No. 3,118,199, granted January 21, 1964, for Surface Hardening for Hammermill Hammers. The hardfacing on the hammers as described in these patents has heretofore consisted of a matrix steel of plain low carbon content such as AISI 1010 steel. Such plain unalloyed carbon steels cannot be as substantially improved by carburizing and/or other subsequent heat treatments as can the alloy steels described herein. For this reason the useful life of the hammers heretofore provided is more dependent on the thickness of the hardfacing material and the extent of the area of fusion between the steel hammer bodies and the surface hardening material.

One set of hammers which for convenience is herein referred to as hammers A were prepared from steel blanks ¼ inch thick, 2 inches wide and approximately 2½ inches long, having serrated end surfaces formed by a parting die, as described in said Patent No. 3,045,934. The serrated end surfaces of hammers A were covered to a depth of approximately ⅛ inch and extending slightly above the serrations by fusing thereto a hard surfacing material comprising 60% by weight of powdered tungsten carbide and 40% by weight of No. 1010 AISI carbon steel as the carbide retaining matrix. Such hammers were allowed to cool and then carburized, quenched and drawn by conventional procedure. The carburizing was performed at a temperature of approximately 1650° F. by applying a reducing gas flame for six hours and until the case extended to a depth of .050 inch. These hammers were then reheated to 1520° F., quenched in oil and drawn at 400° F. for two hours.

A second set of hammers, hereinafter referred to as hammers B, were made according to the present invention for comparison with hammers A above described. Specifically hammers B were prepared from blanks of the same size, shaped and steel as hammers A and the serrated end surfaces of hammer B were covered by fusing thereto face hardening material extending to the same depth and slightly above the serrations as that on hammers A but comprising 40% by weight of powdered tungsten carbide and 40% by weight of No. 4320 AISI alloy steel as the carbide retaining matrix. Hammers B were allowed to cool and were then carburized by heating for a period of six hours at a temperature of approximately 1650° in a reducing gas flame to provide a case of .050 inch depth. Hammers B were finally reheated to approximately 1520° F., quenched in oil and drawn at 400° F. for two hours.

Comparative tests of hammers A and B were run in a commercial grain and soybean processing plant located at Savage, Minnesota. Both sets of hammers were used in the grinding of soybeans until the hammers were no longer economically usable. The average useful life of hammers A was approximately 20 days, whereas that of hammers B was from 30 to 40 days.

Comparative hardness tests were also run on hammers A and B. In these tests a Knoop penetrator was used with magnification 20×. The average Rockwell C matrix hardness for hammers A was equal to 55.4, whereas the matrix hardness of hammers B average 63.2 Rockwell C. It is believed that the greatly improved hardness of the hammers made according to the present invention is at least in part due to the low carbon content of the alloy steel matrix which made the carburizing treatment more effective in the absorption of carbon. The improved malleability of the low carbon alloys of the character described is also an important characteristic in rendering the strip steel suitable for rolling in the fabrication of the welding rod tubes. Also as a result of the improved carbide particle retaining properties of my improved matrix material, it is feasible to reduce the thickness of the face hardening and corresponding amount of face hardening rod used for each hammer and at the same time increase the hammer life some 25–30%. Specifically it has been found that the cost of the face hardening material required for each hammer may be reduced from approximately 12¢ per hammer to 6¢ per hammer while increasing the life of the hammers from 25 to 30%. The total number of hammers used in each hammermill is so great that the saving in cost resulting from the present invention is economically important as is the greatly prolonged life of the improved hammers.

I claim:
1. A method of forming hard facing material on a selected surface of a steel body which comprises:
 (a) heating said surface to the critical temperature at which said surface becomes molten of the steel body;
 (b) applying to said heated surface particles of a hard metal carbide in a matrix comprising a low carbon steel alloy of nickel, chromium and molybdenum in a molten state;
 (c) causing said molten facing material to solidify;
 (d) carburizing the solidified hard facing material and metal body supporting the same to a substantial depth, and
 (e) reheating, quenching and drawing the carburized body to provide an abrasive hard facing thereon characterized by high resistance to spalling and high elastic limit.

2. A method in accordance with claim 1 in which the low carbon steel of said matrix comprises less than .30% carbon, from 3.75% to .40% nickel, from 1.40% to 0.40% chromium, .30% to .08% molybdenum, and said hard metal carbide comprises tungsten carbide.

3. A method in accordance with claim 1 in which the hard metal carbide particles and matrix applied to the heated surface of said steel body comprise approximately 60% carbide particles and 40% low carbon steel alloy.

References Cited by the Examiner
UNITED STATES PATENTS

| | | | |
|---|---|---|---|
| 2,002,198 | 5/1935 | Wissler | 219—145 |
| 2,806,129 | 9/1957 | Cape | 29—191.2 X |
| 2,998,322 | 8/1961 | Strate | 117—46 X |
| 3,029,165 | 4/1962 | Kihlgren et al. | 219—146 X |
| 3,101,274 | 8/1963 | Beyerstedt et al. | 117—46 |
| 3,231,709 | 1/1966 | Foley | 219—145 X |

DAVID L. RECK, *Primary Examiner.*

H. F. SAITO, *Assistant Examiner.*